April 14, 1970   R. M. THOMAS   3,506,905
TRANSISTOR TRIAC REGULATED POWER SUPPLY
Filed March 11, 1968   3 Sheets-Sheet 1

INVENTOR.
ROBERT M. THOMAS
BY Harry A. Herbert Jr.
Robert Kern Duncan
ATTORNEYS

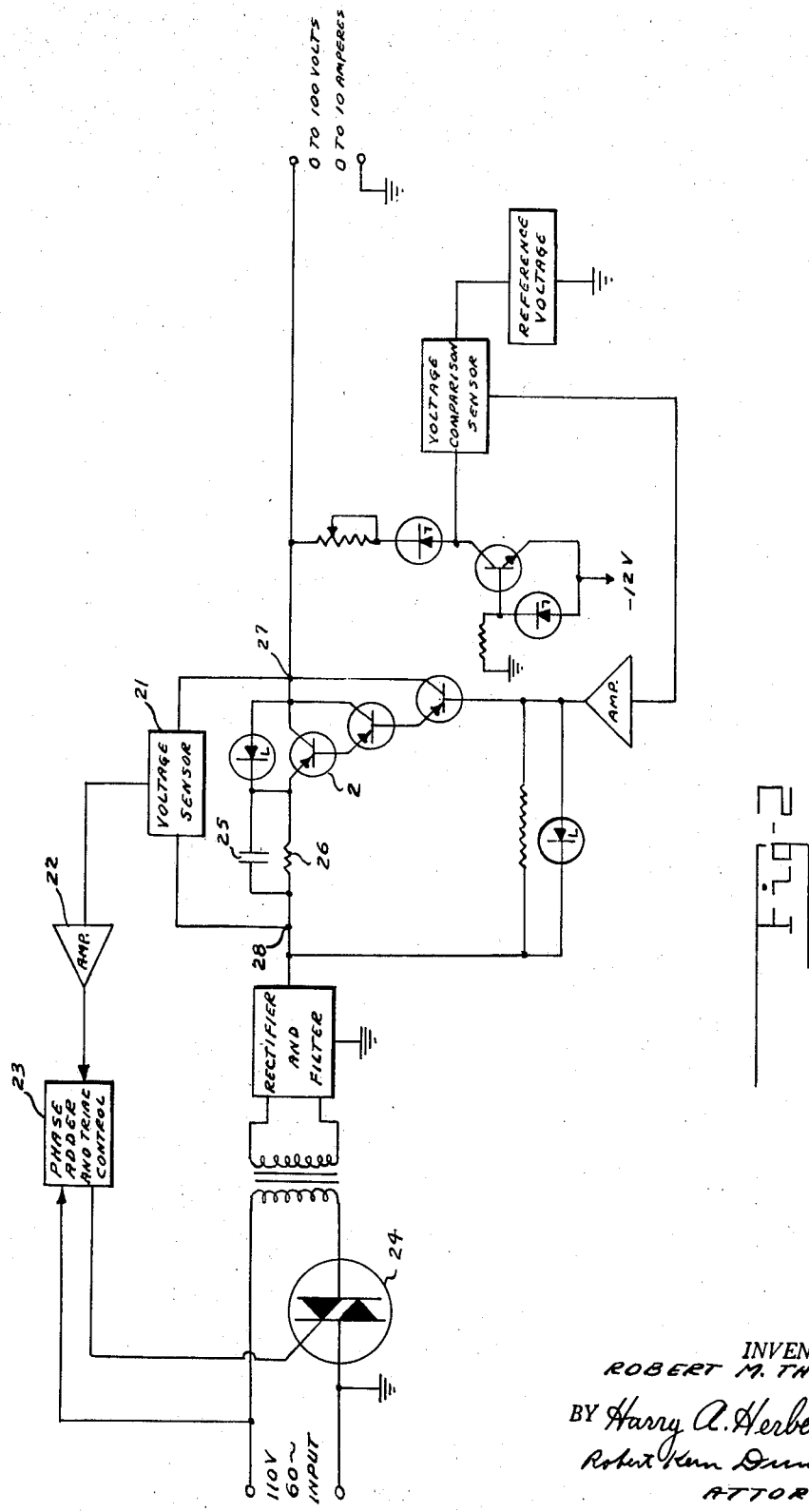

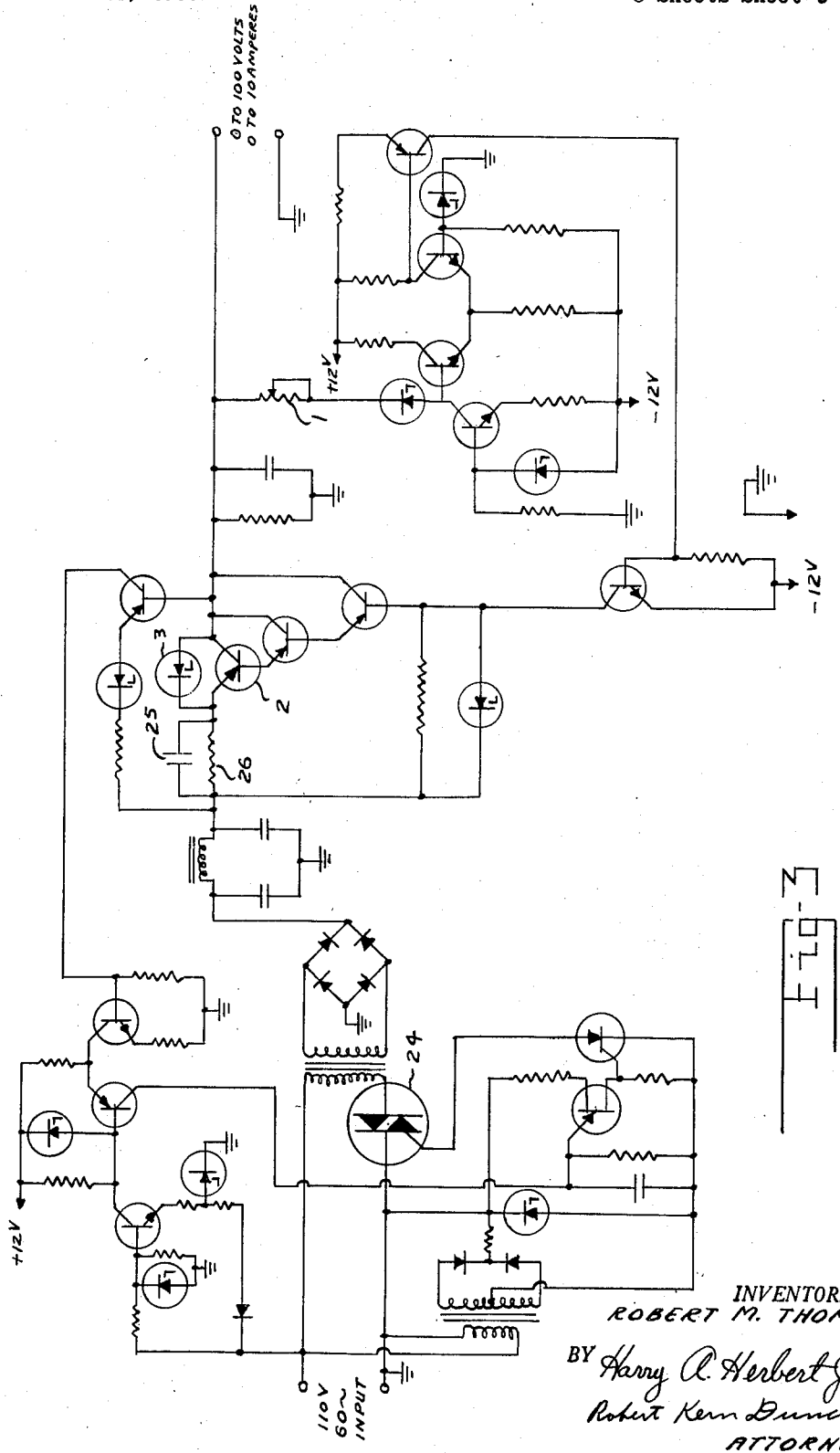

United States Patent Office 3,506,905
Patented Apr. 14, 1970

3,506,905
TRANSISTOR TRIAC REGULATED POWER SUPPLY
Robert M. Thomas, Box 661, Shalimar, Fla. 32579
Filed Mar. 11, 1968, Ser. No. 712,280
Int. Cl. H02m 7/12, 7/24
U.S. Cl. 321—18     2 Claims

ABSTRACT OF THE DISCLOSURE

The power input to a conventional solid state series regulated, variable voltage, power supply is controlled by a triac in the alternating current input to the power supply. The voltage drop across the series regulating transistor of the power supply controls the triac.

---

The invention described herein may be manufactured and used by or for the U.S. Government for governmental purposes without the payment to me of any royalty thereon.

BACKGROUND OF THE INVENTION

Direct current variable voltage, series regulated, power supplies operating from alternating current sources are well known in the electronic and communications fields. With a relatively unlimited amount of power at a constant voltage available from the alternating current mains the series regulating element of a variable output voltage power supply must dissipate a large amount of power when the supply is operated at low voltage and high current outputs. This has been a serious limitation in the design of such power supplies, particularly in relatively high power, power supplies. In power supplies supplying only a few watts of power or in supplies where it is not required that the output voltage be decreased by more than a small percentage of the normal output voltage, i.e., essentially fixed voltage output supplies, this dissipation is not generally a problem. Some prior art power supplies have had manually adjustable taps on the input transformer to the power supply. In these instances an operator adjusts the input to the supply by changing the tap connection on the transformer. This requires a special and expensive transformer and has not been a very satisfactory solution to the problem.

SUMMARY OF THE INVENTION

By sensing the voltage drop across the series regulating element of a variable voltage, series regulated, power supply and using this voltage drop to control a triac which controls the alternating current power input to the power supply, the voltage drop across the series regulating element and the amount of power dissipated in the element is automatically controlled, thus the voltage, current, and power capabilities of conventional variable voltage power supplies may be greatly improved.

BRIEF DESCRIPTION OF THE DRAWING

FIG. 2 is a block diagram of the improved power supply;
FIG. 3 is a schematic diagram of an embodiment of the invention applied to the prior art of FIG. 1.

DESCRIPTION OF THE PREFERRED EMBODIMENT

Figure 1:
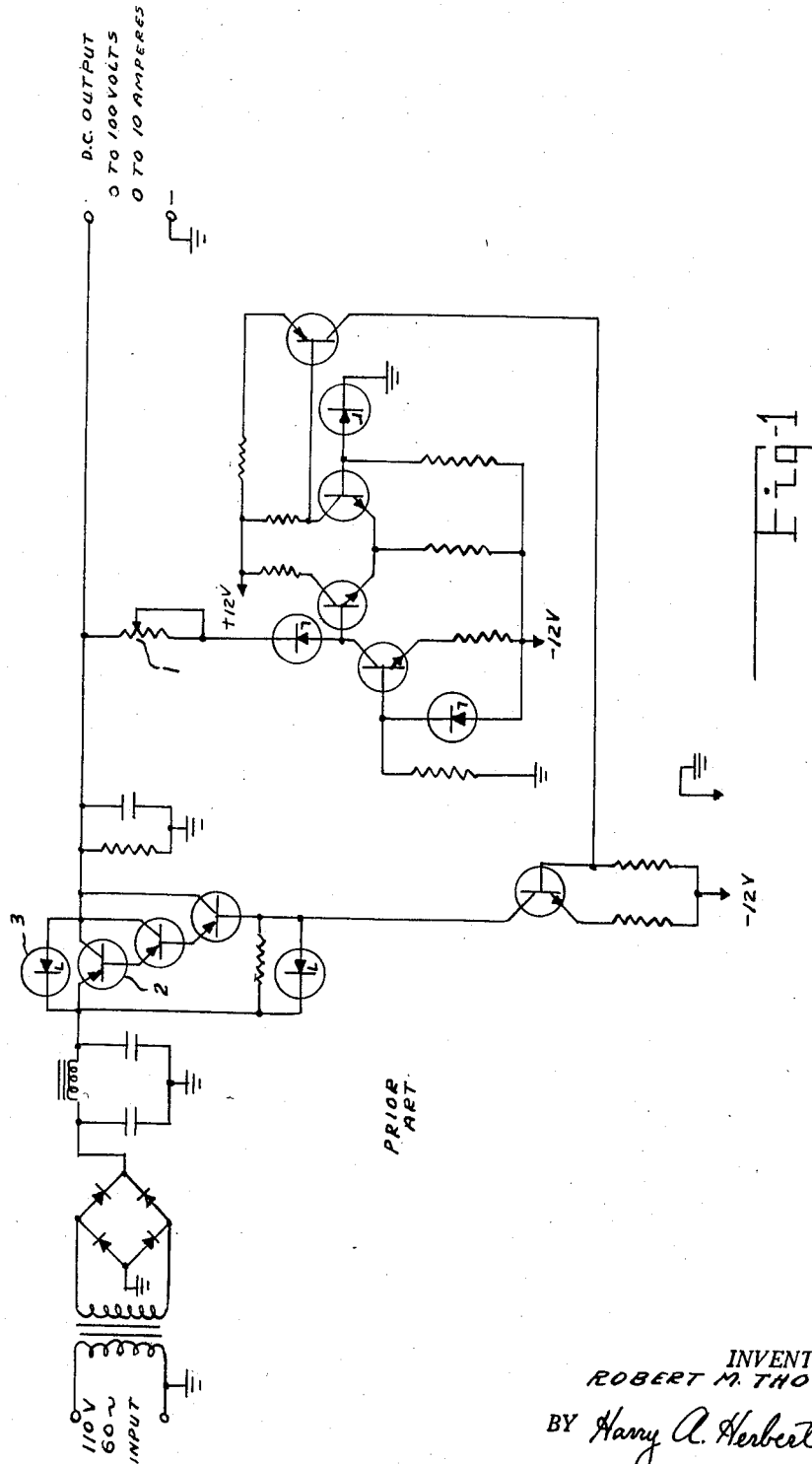
FIG. 1 is a schematic diagram of a typical prior art series regulated variable voltage power supply.

An example of a typical prior art variable voltage, series regulated, power supply is shown schematically in FIG. 1. The supply operates from the conventional 110–120 volt 60 Hz. line. The filtered, regulated direct current output voltage of the supply is adjustable from essentially zero volts to 100 volts by the adjustment of variable resistor 1. This resistor is frequently a ten turn potentiometer. Regulation and voltage control is achieved through the control of transistor 2 as is well known and understood. Zener diode 3 is omitted in many conventional power supplies. It is used as a protective device for transistor 2, and under normal operation has a negligible effect on the power supply.

In this particular prior art device the dissipation in the series element becomes approximately one kilowatt for an output from the supply of 10 amperes at 2 volts. The improvement herein disclosed reduces this dissipation to approximately 40 watts when operating under the same conditions. This provides for an equivalent supply utilizing much smaller and more economical regulator parts; or, in the alternative, the utility of a conventional supply may be greatly extended by the incorporation of the improvement disclosed herein.

FIG. 2 is a block diagram of the power supply of FIG. 1 with the incorporation of this invention. The combinations added to the supply of FIG. 1 are: a voltage sensor 21 for sensing the voltage drop (essentially) across the series regulating transistor (that is, the drop between the emitter and collector elements of the transistor) and providing a control signal voltage in response to this voltage drop; and amplifying stage 22 for amplifying the control voltage; a phase adder and triac ramp pedestal control 23 for providing a control voltage to the triac; a triac 24 connected between the power supply and the alternating current source for conrolling the alternating current power input to the variable voltage regulated power supply; and an energy storage circuit comprising parallel connected capacitor 25 and resistor 26, connected in series with the emitter element of the regulating transistor, for improving the transient response of the power supply. In this specific embodiment of the invention as used with the specific conventional supply previously described, resistor 26 is a one ohm resistor, and capacitor 25 is a 10,000 microfarad capacitor. This RC circuit enables the improved supply to have the transient response time of the conventional series regulated supply. Thus, if the supply is operating at very low current output, most of the voltage drop from points 27 to 28 will appear across the transistor 2. The remainder of the drop between these points will be across the resistor and capacitor, and the energy storage capacitor will be charged to this potential. When there is a sudden demand for high current output (up to the rated value—10 ampres in this case), the 10 millisecond time constant of the RC combination 25 and 26 will supply power until the relatively slow responding triac and its associated circuitry has time to compensate for the sudden power demand.

FIG. 3 is a complete schematic diagram of a specific embodiment of this invention in combination with the previously enumerated prior art power supply. Those skilled in the art will readily practice this invention with other series regulated variable voltage supplies, and will modify the details of the circuit and the values of the components accordingly within the teachings contained herein.

What is claimed is:
1. The improvement in a solid state, variable voltage, series regulated, direct current power supply having a transistor series regulating element and an alternating current input, the said improvement for decreasing the power dissipation in the said transistor series regulating element by controlling the voltage drop between the emitter and collector of the said transistor, the improvement comprising:
- (a) voltage sensing means cooperating with the said transistor series regulating element for providing a control voltage responsive to the said voltage drop between the emitter and the collector of the said series regulating transistor;
- (b) Amplification means for amplifying the said control voltage of the said voltage sensing means;
- (c) Triac alternating current control means connected between the power supply and the alternating current input for controlling the alternating current input to the said power supply;
- (d) phase added and triac control means responsive to the said amplified control voltage and cooperating with the said triac whereby the alternating current power input to the said power supply is controlled responsive to the said voltage drop between the emitter and the collector of the said series regulating transistor; and
- (e) energy storage means connected in series with the said emitter of the transistor regulating element for providing transient response.

2. The improvement as claimed in claim 1 wherein the said energy storage means is a parallel connected capacitor and resistor.

References Cited

UNITED STATES PATENTS

| | | | |
|---|---|---|---|
| 3,213,351 | 10/1965 | Walker | 321—18 |
| 3,289,069 | 11/1966 | Todd | 321—18 |
| 3,348,131 | 10/1967 | Banks | 323—24 |

LEE T. HIX, Primary Examiner

W. H. BEHA, JR., Assistant Examiner

U.S. Cl. X.R.

321—24